April 12, 1949.  H. J. JANNEY  2,466,707
INCENDIARY TACK
Filed May 27, 1944  2 Sheets-Sheet 1
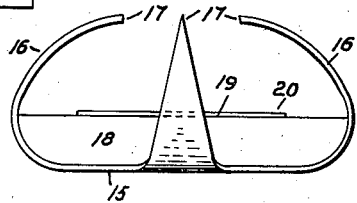
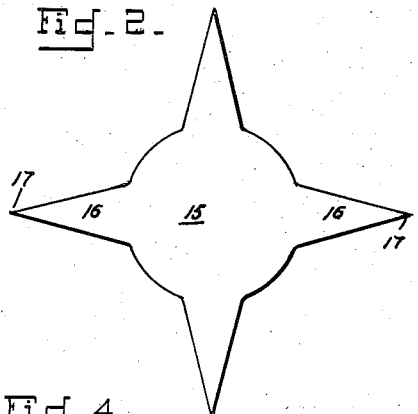
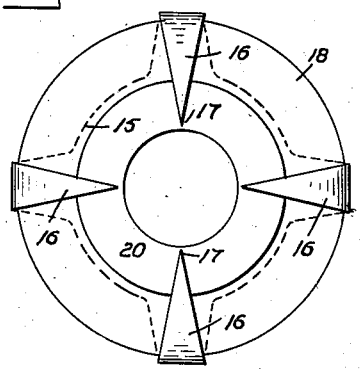
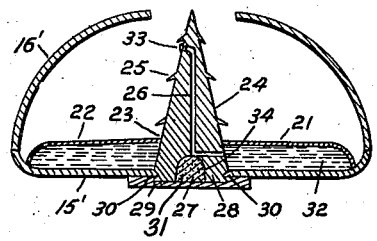
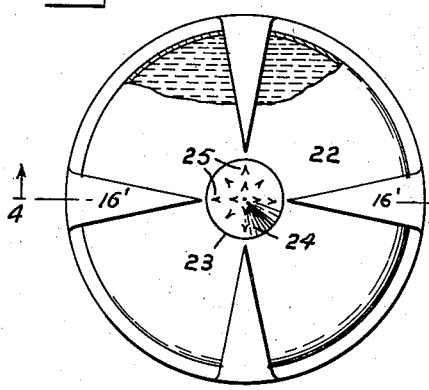
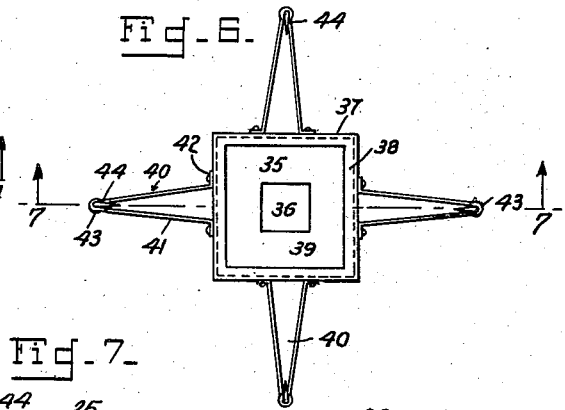
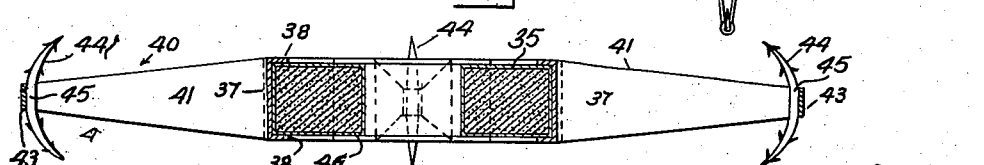
Inventor
Herman J. Janney
By C. E. Herrstrom & H. E. Thibodeau
Attorneys April 12, 1949. H. J. JANNEY 2,466,707
INCENDIARY TACK
Filed May 27, 1944 2 Sheets-Sheet 2
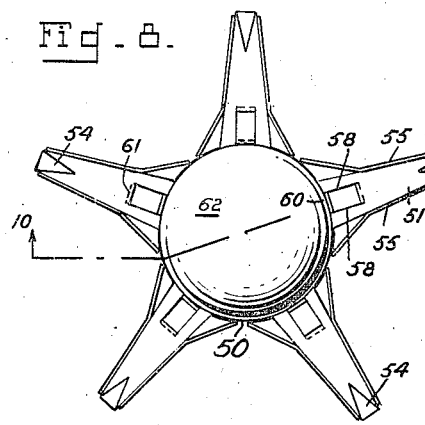
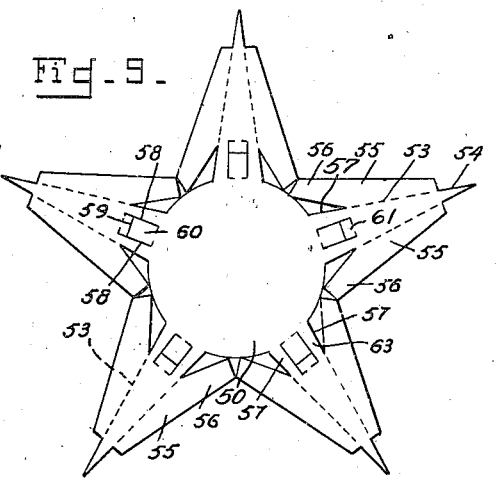
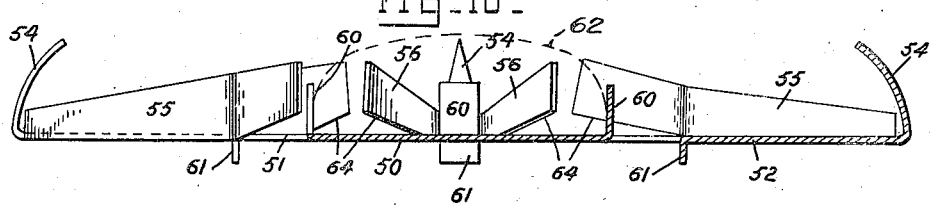
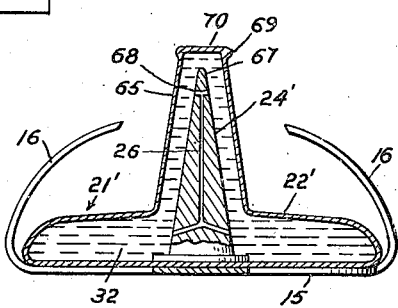
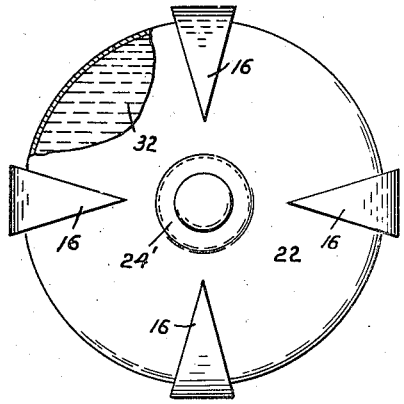
Inventor
Herman J. Janney
By C. E. Herrstrom & H. E. Thibodeau
Attorneys Patented Apr. 12, 1949

2,466,707

UNITED STATES PATENT OFFICE 2,466,707

INCENDIARY TACK

Herman J. Janney, Opportunity, Wash.

Application May 27, 1944, Serial No. 537,669

8 Claims. (Cl. 102—8)

(Granted under the act of March 3, 1883, as amended April 30, 1928; 370 O. G. 757)

The invention described herein may be manufactured and used by or for the Government for governmental purposes without the payment to me of any royalty thereon.

The invention relates to means for disrupting transportation of material and particularly material transported by truck, as well as to hamper military operations involving travel of equipment of any kind over roadways, particularly vehicles having tires or other traction means of readily penetratable material.

It is also an important aim to provide means of this effect which will have value generally as an incendiary device.

It is a particular object of the invention to present a simple means to effect destruction of the conventional tires of vehicles, and also the said vehicles and their loads.

An important object of the invention is to present a simple device which the pneumatic tire of a vehicle may be converted into an explosive mine of large power, and to effect detonation thereof.

Another object is to present a device for attaining the above objects which will be small and compact, and may be sown over selected areas from airplanes, as well as to distribute otherwise, without the distribution becoming at once obvious.

The invention seeks to present a device which corresponds functionally in part to a tack which may be spread in numbers over road and ground areas where vehicles, including grounded airplanes, may be expected to pass, and which will fasten itself upon the tires of such vehicles and function automatically for the purpose indicated.

A further aim of the invention is to provide an inconspicuous tack-like device which apparently is incapable of penetrating through the tread of a tire, but which will include means to drive a short penetrating member into a tire effectively.

An additional purpose is to make available a tack device embodying novel features of structure and materials for the attainment for the foregoing objects.

There are additional objects, advantages and features of invention which will be understood or become apparent from the following description and accompanying drawings, wherein:

Figure 1 is an elevation of a tack device embodying the invention,

Figure 2 is a plan of the blank for the body of the tack of Figure 1 reduced in size, Figure 3 is a top view of the tack of Figure 1, Figure 4 is a vertical sectional view of a modification of the tack taken in a plane indicated by the line 4—4 of Figure 5, Figure 5 is a top view of the last mentioned tack, Figure 6 is a top view partly in section of a further form of the tack specially suitable for distribution from an airplane, Figure 7 is an enlarged sectional view on line 7—7 of Figure 6, Figure 8 is a top plan view of a still further tack form, adapted to be hand-laid, Figure 9 is a plan of the body portion of the form shown in Figure 8 prior to bending into final form, the body of incendiary material being omitted, Figure 10 is a section, partly in elevation, taken substantially on the line 10—10 of Figure 8, the incendiary disc being omitted for clarity, Figure 11 is a view, similar to Figure 4, of a modification of the form of the invention shown in the said figure, and, Figure 12 is a top view of the last named modification.

There is illustrated in Figures 1 to 3 inclusive, a tack comprising a resilient sheet metal shell having a central body or bottom part 15 substantially flat, from which radiate a number of tapered comparatively stiff arms 16, the lateral edges of which converge to form sharp points 17, the material used being of such thickness and quality as to enable the points to readily enter rubber and fabric of conventional vehicle tires, tank treads, airplane tires and the like. The central body portion 15 in the blank from which the shell is formed may be of comparatively small diameter, and the arms 16 are bent upwardly and curved inwardly over and a distance above the bases of the arms as shown in Figure 1, the curve on which each arm is bent corresponding substantially to elements of a sphere having its center at the upper surface of incendiary material carried by the device as will be described, being inclined downwardly and outwardly from the inner part of the article. However, other curves may be used without detriment, it being the purpose to form these arms and points to support the device when nearly inverted, so that it will tend to roll into the operative position shown in Figure 1, the center of gravity of the article being beyond the center of the spherical elements.

Set and fixed within the shell next to the body portion 15 is an incendiary mass or body 18 of any approved composition suitable for the purposes herein described, this body being preferably hard and not easily fractured, and adapted to be secured conventionally in the shell either before or after shaping the arms 16, as for instance by being shaped while in a plastic form from a suitable material which may harden thereafter. In the instant case material 18 preferably includes thermite with magnesium particles admixed, held by a proper binder which may itself be combustible, such as asphalt, gilsonite, cellulose initially plastic in a suitable solvent, cellulose nitrate, or some other plastic, so called, of a suitable nature generally for the use intended. A thermo-plastic not adapted to be softened excessively by atmospheric temperatures may be found desirable, so that the mass 18 will tend to soften and separate into particles when the reaction of the incendiary material is initiated and these particles will be thrown about by the rotation of a tire or the like to which the tack is attached.

The body 18 is substantially biscuit-shaped in the illustrated embodiment, its top surface 19 being spaced below the points 17 to permit ready entry of the latter into rubber or rubber-like material to such depth as will hold the body 18 firmly against the surface penetrated by the points. On the top surface of the body 18 there is secured or applied an igniter ring or band 20, suitably exposed to be ignited by friction against an engaged tire or the like. This igniting ring may be made in separate parts or formed continuous. It may consist of a phosphorus sulphide and potassium chlorate or other compound, preferably such as are used in waterproof match heads, with or without a component of phosphorus, and/or a fuse powder, more or less dominant. These compounds being well understood, they are not set forth in detail here. A lachrymal or poison gas evolving material may also be included in the body 18 if desired.

It should be noted that the arms 16 are so curved that when the body 18 is rested upon a horizontal surface engaging the arms inwardly of their points the center of gravity will fall laterally of a line perpendicular to such surface at the point of contact and toward the bottom 15, so that the shell will tend to rock or roll to an erect or operative position with the bottom 15 flat against the supporting surface. The shell will tend to assume such operative position on rough surfaces such as dirt, gravel roads, or landing fields for aircraft as well as on paved or macadamized roads.

The tack may be produced in large quantities, in a small size, and scattered over roads or battle areas where it may serve its purpose. This can be done by hand or by scattering machines, from airplanes, land vehicles, or by men on foot. Upon reaching the ground or road surface, the automatic erecting function involved in form of construction described causes the tacks to lie with their bottoms flat on the ground and the point 17 directed upwardly.

When a vehicle tire or tank tread of rubber encounters one of these erected tacks the points 17 penetrate the engaging material, and the surface of the tire or block comes to a forcible bearing on the igniting ring 20, the friction of the tire surface thereon igniting the band which quickly initates the burnng of the incendiary. The heat given off by the burning band and the incendiary initiates the reaction in the thermite mixture, softening or melting the binder on the body 18. Continued movement of the vehicle may throw particles of the burning material upward into the vehicle, as well as forwardly and to some extent rearwardly, with consequent damage either incendiary or by welding the thermite products onto operating parts of the vehicle. By including lachrymal or suffocating gas in the body 18 the occupants of the vehicle may be rendered impotent.

A modification of the incendiary tack is shown in Figures 4 and 5 wherein the base portion 15' is generally similar to that first described, but instead of an incendiary mass exposed for ignition, a doughnut-shaped sealed collapsible container or chamber 21 having flexible walls tough enough to withstand comparatively high hydrostatic bursting pressure, is substituted therefor, positioned in substantially the same location. The base portion 15' corresponds to but is somewhat larger in diameter than the part 15 beforementioned, and may form one wall of the chamber 21 if desired by having the periphery of the top wall 22 united therewith. In an opening 23 through the top wall 22 there is set a cone-shaped spike 24 to which the inner edge of the wall 22 is united, the base of the spike being secured coaxially to the base portion 15'. The spike may be formed with barbs 25 for purposes which will appear. A duct 26 is formed through the spike, extending from adjacent the point thereof to an exit located near its base, the passage therethrough opening through the sides of the spike at both ends. The base of the spike is recessed to receive a primer-type explosive element 27. The spike body may be produced by adaptations of nail making machines, and is secured in the base portion 15' by a tenon part 28 formed on the base and inserted through an opening in the portion 15', the said tenon being upset to hold the spike securely in place. The primer, which may be either a percussion device or one having an exposed friction ignited fuse, or both, extends somewhat below the plane of the base portion 15'.

A lead plate or washer 29, acting as a guard plate to delay detonation of the primer 27, is secured to the underside of the plate 15', held in place by an overhang 30 or by upsetting the edge parts of the tenon 28. The plate 29 is thick enough to extend below the sensitive surface 31 of the primer, so that when the assembly is set upon a flat surface the primer is not engaged by said support.

The chamber is filled with gasoline or other inflammable and highly volatile liquid 32. To prevent the escape of the liquid through the spike until subjected to a predetermined minimum operating pressure, a plug or diaphragm 33 of a material which will yield to such pressure is engaged in the outer end of the passage 26. The plug 33 may be either an inserted piece held frictionally and expellable under a given pressure, a material adherent to the wall of the duct or external surface of the spike yieldable either by disruption or separation of the spike under predetermined pressure, or a material and a solvent volatile liquid applied to the side of the spike by some convenient method and having sufficient viscosity and low surface tension so that it will form a film across the opening at the upper and outer end of the duct 26 and when dry will constitute a diaphragm rupturable by the liquid at the desired pressure. Such material as neoprene, Thiokol, or other products not soluble in liquid 32 may be used for the plug. The closure may also consist of a thin web or foil of metal conveniently formed and applied. The stock sheet material for the shell part of this modification may be thinner than that used in the shell 15 and untempered for easy collapse. In use, this modification of the invention is distributed in ways described above. The arms 16', corresponding to the arms 16 first described, are intended principally to effect the erection of the tacks and will operate little if at all, as tire penetrating members. They will collapse under the weight of the vehicle. After the spike has penetrated sufficiently to permit the periphery of the tire to engage against the top wall 22, the latter will yield and the liquid therein is subjected to sufficient pressure to eject the plug 33 and permit discharge of the said liquid through the spike and into the engaged tire, the outer end of the duct now extending inwardly well into the air space within the tire. Even if the air content has not been heated by friction incident to the travel of the vehicle, the liquid injected into the tire soon forms a highly explosive mixture. The soft lead washer 29 quickly wears away during the travel of the vehicle, and the cap 27 is detonated by engagement with road or earth surfaces. The charge in the primer device drives the spike into the tire, effecting ignition of the explosive mixture therein. Since the duct 26 communicates with the recess 34 in which the primer 27 is set, ignition of the combustible gas in the tire may come about by the projection of flame from the detonating primer through the said duct.

In Figures 11 and 12 I have shown a modification of the form of invention shown hereinbefore in Figures 4 and 5. The explosive tack is constructed with the shell part substantially the same as the shell of Figures 4 and 5, including the spike, primer, and lead washer assembled substantially as described. The top wall 22' of the collapsible chamber 21, however, instead of being connected to the spike 24' is formed with a dome-like substantially conical central part 65 the base of which is slightly greater in diameter than the adjacent part of the spike and the side walls of which extend upwardly spaced from the spike. The apex of the dome 65 is flattened and spaced above the spike point 67. There is thus provided a clearance between the spike and upper wall portions of the collapsible chamber which will permit relative movements of the wall and dome to accommodate expansion and contraction of the liquid 32 in the chamber, which liquid may be of the same nature as that first described. The duct 26 in the spike need not be plugged or closed in any way.

This form of the invention functions in substantially the same way as does the device Figures 4 and 5 except that the liquid is released by the puncturing of the apex portion of the dome 65 by the spike when a tire or the like is pressed down thereon, forcing the dome downward around the spike and below an upper port 68 opening from the duct. To avoid any possibility of the dome metal resisting complete penetration by the point, I have provided an integral ring 69 of thickened material with an interior diameter slightly greater than that of the spike at the port 68, forming the boundary of the apex of the dome, a flat thin diaphragm 70 of the same metal, or of a different and softer metal, formed within the ring 69 continuous therewith.

Under the influence of a high atmospheric temperature or one below a reasonable critical maximum, the expansion of the liquid 32 will be accommodated by flexure of the top part of the chamber wall and it may strain toward the closer approximation of sphericity of which it is capable, within sufficient limits, without rupture. The difference between the cubic contents of the chamber in its initial form and in its approximation of a hemisphere under expansion of the liquid may be calculated and desirable proportions for practical function determined. Tin may be used for at least the top part of the chamber.

In Figures 6 and 7 I show a further modification intended particularly to be dropped from airplanes. In this instance, the flat square body 35 is made of material of appropriate thickness similar to that used in the form first described. A square opening 36 is centered in the body 35 with its sides parallel to those of the body. The width of the opening along its sides is approximately one-third of the corresponding measurement of the body 35. The body 35 is bounded by a four-wall sheet metal casing 37, having an inwardly extended flange 38 along each side of the top and bottom over and under the body 35 as a retainer, so that the major face portions 39 of the body are exposed.

Attached to each of the four sides of the casing are respective arms 40 each consisting of a strip of sheet metal bent centrally to form diagonal side portions 41, the extremities of which are bent outwardly to form attaching flanges 42 which are secured to the wall 37. At the mutual junction of the sides 41 in each arm the metal is formed as a collar 43, in which is set and secured a double spike having barred spikes 44 on each end of a shank portion 45. Each arm 40 is tapered from its extremities to the collar 43.

The size and amount of incendiary material carried in the body 35 should be sufficient to effect the destruction of an engaged tire when ignited. The body of incendiary material is faced on each exposed side with an igniter which may be a layer or coating 46 of material ignitable by friction, and having additional heat-evolving elements as a part of or underlying said coating.

When this form of incendiary tack is thrown from a great height, the opening 36 will minimize its tendency to drift, and when it reaches the ground surface its tendency to roll is greater reduced by the four divergent arms, and it is also incapable of remaining on edge on ordinary horizontal surfaces and will fall to a position where one face 39 will lie flat against the ground or roadway. When encountered by a tire, the upper four spikes 44 are capable of entering the tire and remain secured thereto by the barbs and the friction between the spike body and the material of the tire. Having face coating material 46 next to both tire and roadway, friction will soon cause ignition thereof.

In Figures 8 to 10, inclusive, there is shown another form of the invention particularly adapted to be distributed by hand. In this instance a spider frame is stamped integrally from one piece of sheet metal. It comprises a central flat body plate 50, circular in form and adapted to support incendiary material. Five spurred grab arms 51 radiate from body plate 50 and are so arranged that when the body part is depressed the arms swing upward and inward convergently.

In the illustrated embodiment, five said arms are shown, each of which is substantially channel-shaped in cross section, being U-shaped in section at their outer portions and having the inner portions of the sides disconnected from the bight portions for the peculiar functions involved.

The flat bottom web or bight portion 52 of the arm is defined by two side lines 53 converging from the periphery of the plate 50 at an angle of approximately 25°, and toward the medial radius of the arm. A point or spike 54 is formed integrally therewith by a continuation of the material radially with edges at a somewhat more acute angle. Flanges 55 are formed on each side of the bight extending upwardly at right angles but stopping at the base of the spike 54. Continuations 56 of the said flanges are formed extending nearly tangential to the body plate 50 in the blank but separate therefrom. The material of the blank between these continuations 56 and the lines 53 is cut out leaving an unflanged edge 57 at the base of the web 52. Since the flanges 55 are gradually increased in dimension between the lines 53 and their outer or top edges from adjacent the spike to the beginning of the continuations 56, the latter may decrease in height from these junctions to their inner extremities.

At the base of the arm two parallel slits 58 are formed in the blank extending from a geometrical continuation of the circular boundary of the plate body 50 outward, and a short distance inwardly of the extremities of these slits a concentric slit 59 is formed extending between the slits 58. The parts 52 of the arms remain in a plane with the body 50 while the flanges 55 are bent upward as indicated. The material 60 between the slits 58 is bent forward to form a charge-centering tongue as will be described, while the material immediately outward thereof is bent downward to form a lifter flange 61. The spike part 54 is bent upward and shaped suitably for its penetrating function.

A circular body or disc 62 of incendiary material such as before described is set upon the plate 50, held in place by the centering tongues 60 the upper portions of which may be turned inward over the material 62. Between the edges 57 and the edges of the opening formed when the tongues 60 are bent upward there remains narrow connecting bars 63, more flexible than the outer parts of the arm.

The continuations 56 are bent slightly outward so that their extremities may lie nearly tangentially against the periphery of the disc 62. The lower edges 64 of the continuations 56 are inclined upwardly from adjacent their bases, while their upper edges are approximately horizontal and on a level with the top of the body 62. If desired, the body may be partly encased after the manner illustrated in Figures 6 and 7.

The last described incendiary tack is intended to be laid on roadways and pavements where vehicles, including airplanes, may be expected to travel, with the plate 50 at the lower side and the device supported on the downturned lifters 61.

When this device is engaged by the tires or tread blocks of a passing vehicle, airplane, or tank, the spikes 54, first engaged enter the material of tire, and the weight of the vehicle is imposed on the disc 62 and the extensions 56. Since the device is supported on the roadway entirely by the flanges 61, and the plate 50 is initially spaced from the road surface, the narrow connecting portions 63 yield to the weight, bending at the edge of the body part 50. This causes the outer ends of the arms to swing upwardly and slightly inwardly toward the vertical axis of the device, resulting the imbedding of all the spikes deeply in any tire or block material thereover before collapse of the flanges 61 or the straining of the other parts by crushing forces communicated by the tire or block. Thereafter, the device remains anchored to the penetrated material with the top surface of the body engaged frictionally therewith. This frictional engagement soon ignites the surface material, with consequent initiation of reaction in the thermite material as may be understood, with other effects and results as hereinbefore described.

While I have indicated that the spikes are formed integral with the body frame or shell part where a gravity-erected tack is involved, these rolling supports may be formed separately out of other materials and shapes if desired, either attached or integral.

In the claims the word "offensive" is used in the sense of military action.

It should be noted that the form of the shell illustrated in Figures 1 to 5, and 10 and 11, because of the location of the center of gravity, the tack as a whole tends to return it to its normal operative position when displaced therefrom, and the said tack may therefore be said to be an article or body part at stable equilibrium.

In the claims, it is contemplated that the term "inflammable" shall include "explosive," and also materials producing heat reaction such as is produced in thermite.

Having disclosed my invention in the best embodiments known to me, it will nevertheless be understood that this disclosure is exemplary only, and that changes and modifications in the construction, arrangement, and combination of parts, or substitution of materials and equivalents, may be made without departing from the spirit of the invention within the scope of the appended claims.

I claim:

1. An article of the character described consisting of a base portion including a number of symmetrically arranged, upwardly extended inwardly curved rocker arms adapted to support the article when in inverted or other inoperative position and having an operative or erect position with said base at the bottom of the article, a spike set axially in said base, having a longitudinal duct therethrough opening exteriorly from the spike near its outer end, and also at the lower part of the spike, a sealed flexible walled chamber formed around the spike at said base portion and in communication with the lower end of said duct at least, said arms and chamber being collapsible under impingement of vehicle tires, a volatile inflammable liquid in the chamber and a primer in the base of the spike adapted to be detonated by road impact.

2. An article of the character described comprising a base plate, an upstanding pointed spike thereon having a point and a duct longitudinally therein opening therefrom adjacent its point and also opening from the spike near its base, and a flexible walled collapsible chamber formed on said plate around the spike including a major flattened top wall part around and spaced from the spike intermediately of its height and a hollow upwardly extended wall integral with the flattened wall and surrounding the spike in a relation for vertical movement relatively to the spike and having a closing top portion spaced above the point of the spike, said top portion at least being penetrable by said spike and said chamber being collapsible under pressure of a vehicle tire impaled on the spike.

3. In an incendiary tack, a normally horizontal base portion having a normally vertical central axis, and a plurality of upwardly and inwardly extending arms terminating in spaced relation about said central axis, each said arm terminating in a point, and a body of explosive material carried by said base portion within the confines of said arms.

4. In an incendiary tack, a flat normally horizontal base portion having a normally vertical central axis and a plurality of integrally-connected upwardly and inwardly extending arms terminating in symmetrical spaced relation about said central axis, each arm terminating in a point, a body of explosive secured on said base portion within the confines of said arms, and a spike secured to and extending upwardly from the center of said base portion between said arms.

5. In an incendiary tack, a flat normally horizontal base portion having integral, circumferentially-spaced upwardly and inwardly extending arms, each arm being pointed, said arms terminating in spaced symmetrical relation about a central normally vertical axis of said base portion, means secured to the upper surface of said base portion and forming therewith a collapsible liquid container between said arms, a spike secured to said base portion and extending centrally upwardly therefrom and terminating substantially in the plane of the terminals of said arms, there being a duct in said spike opening at one end into said container said duct opening at its other end through the wall of said spike adjacent the tip thereof, a body of incendiary liquid in said container, and means carried by said base portion to ignite said liquid.

6. In an article of the character described, a base portion, a spike carried by and projecting from said base portion, there being an axial duct through said spike, means carried by said base portion forming a collapsible chamber in communication with one end of said duct, the other end of said duct opening to the exterior of said spike near the tip thereof, and a quantity of incendiary liquid in said chamber, whereby, when a tire passes over said spike and is punctured thereby, said chamber is collapsed and a portion of said liquid is forced into the tire.

7. The structure of claim 6 in which means are included to erect the article from an inoperative position on a horizontal surface to a predetermined single operative position.

8. The structure of claim 6 in which the article has universal rocker portions thereon and is shaped, and its parts arranged, to constitute a body of stable equilibrium with respect to a single operative position.

HERMAN J. JANNEY.

REFERENCES CITED

The following references are of record in the file of this patent:

UNITED STATES PATENTS

| Number | Name | Date |
| --- | --- | --- |
| 2,320,903 | Archer | June 1, 1943 |
| 2,363,626 | Uzmann | Nov. 28, 1944 |

FOREIGN PATENTS

| Number | Country | Date |
| --- | --- | --- |
| 16,192 | Great Britain | June 21, 1906 |
| 70,914 | Switzerland | Nov. 16, 1915 |
| 111,981 | Great Britain | Dec. 20, 1917 |
| 604,515 | Germany | Oct. 22, 1934 |
| 784,754 | France | May 6, 1935 |